United States Patent
Harris et al.

(10) Patent No.: US 11,858,408 B1
(45) Date of Patent: Jan. 2, 2024

(54) TRUCK BED COVERS WITH AIR BLADDERS AND VEHICLES INCLUDING THE TRUCK BED COVERS

(71) Applicant: Toyota Motor Engineering & Manufacturing North America, Inc., Plano, TX (US)

(72) Inventors: Ryan C. Harris, Saline, MI (US); Scott L. Frederick, Brighton, MI (US)

(73) Assignees: Toyota Motor Engineering & Manufacturing North America, Inc., Plano, TX (US); Toyota Jidosha Kabushiki Kaisha, Aichi-Ken (JP)

( * ) Notice: Subject to any disclaimer, the term of this patent is extended or adjusted under 35 U.S.C. 154(b) by 35 days.

(21) Appl. No.: 17/835,446

(22) Filed: Jun. 8, 2022

(51) Int. Cl.
*B60P 7/06* (2006.01)
*B60J 7/16* (2006.01)

(52) U.S. Cl.
CPC ............. *B60P 7/065* (2013.01); *B60J 7/1607* (2013.01)

(58) Field of Classification Search
CPC .. B60J 7/141; B60J 7/16; B60J 7/1607; B60P 7/06; B60P 7/065
USPC ........................................ 296/100.01, 100.02
See application file for complete search history.

(56) References Cited

U.S. PATENT DOCUMENTS

| | | | |
|---|---|---|---|
| 6,634,691 B2 | 10/2003 | Henderson | |
| 8,550,538 B1 | 10/2013 | Brandenburg | |
| 9,682,733 B2 | 6/2017 | Krishnan et al. | |
| 10,427,724 B2 * | 10/2019 | Line | B62D 63/04 |
| 10,589,803 B2 | 3/2020 | Povinelli et al. | |
| 2003/0165368 A1 * | 9/2003 | Rostoker | B60P 7/065 410/118 |

FOREIGN PATENT DOCUMENTS

| | | | | |
|---|---|---|---|---|
| DE | 19501875 A1 | 7/1996 | | |
| DE | 102020209333 A1 * | 1/2022 | | |
| DE | 102021104075 A1 * | 8/2022 | | |
| WO | WO-9601194 A1 * | 1/1996 | | B60P 7/065 |

* cited by examiner

*Primary Examiner* — Jason S Daniels
(74) *Attorney, Agent, or Firm* — Dinsmore & Shohl LLP

(57) ABSTRACT

A truck includes a passenger cabin and a truck bed located rearward of the passenger cabin in a vehicle longitudinal direction. The truck bed includes a bed deck and a pair of spaced apart sidewalls. A compressor unit is located between an inner sidewall panel and an outer sidewall panel of one of the sidewalls. A truck bed cover covers the truck bed. A bladder is connected to an underside of the truck bed cover. The compressor unit connected to the bladder and configured to inflate the bladder.

13 Claims, 4 Drawing Sheets

US 11,858,408 B1

TRUCK BED COVERS WITH AIR BLADDERS AND VEHICLES INCLUDING THE TRUCK BED COVERS

TECHNICAL FIELD

The present specification generally relates to trucks and, more specifically, to pickup trucks with truck beds and bed covers with connected air bladders.

BACKGROUND

Vehicles often have storage areas where cargo is stowed. An example is a pickup truck with a truck bed. Truck bed covers are provided that are used to cover the truck bed and tailgates close off a rear side of the truck bed. Cargo can be placed in the truck bed. This cargo can vibrate and shift during operation of the truck. Straps may be used to tie down the cargo. What is needed are other cargo stabilizers that can also be used for other functions.

SUMMARY

In accordance with one embodiment, a truck includes a passenger cabin and a truck bed located rearward of the passenger cabin in a vehicle longitudinal direction. The truck bed includes a bed deck and a pair of spaced apart sidewalls. A compressor unit is located between an inner sidewall panel and an outer sidewall panel of one of the sidewalls. A truck bed cover covers the truck bed. A bladder is connected to an underside of the truck bed cover. The compressor unit connected to the bladder and configured to inflate the bladder.

In accordance with another embodiment, a method of providing a cargo stabilizer for a truck bed includes connecting a bladder to an underside of a truck bed cover. A compressor unit is placed between an inner sidewall panel and an outer sidewall panel of the truck bed. The compressor unit is fluidly connected to an inlet of the bladder.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following description of the illustrative embodiments can be understood when read in conjunction with the following drawings, where like structure is indicated with like reference numerals and in which:

DETAILED DESCRIPTION

Pickup trucks according to the present specification include a passenger cabin and a truck bed located rearward of the passenger cabin. The truck bed includes opposite sidewalls and a bed deck that extends between the sidewalls. The sidewalls are formed by an outer sidewall panel and an inner sidewall panel. At least one of the sidewalls includes a pressurized air system that is located between the respective outer sidewall panel and inner sidewall panel. The pressurized air system may include a compressor unit that is fluidly connected to an outlet in the inner sidewall panel. The outlet may include a connector that can be used to connect to a conduit. The conduit may be used to direct pressurized air to a bladder that is attached to an underside of a bed cover. The bladder can be inflated while attached to the bed cover to extend down into a truck bed. The bladder can be used as a cargo stabilizer by impinging on the cargo and limiting the ability of the cargo to move around in the truck bed. The bladder can also be removed from the underside of the bed cover and used as a mattress.

Figure 1:
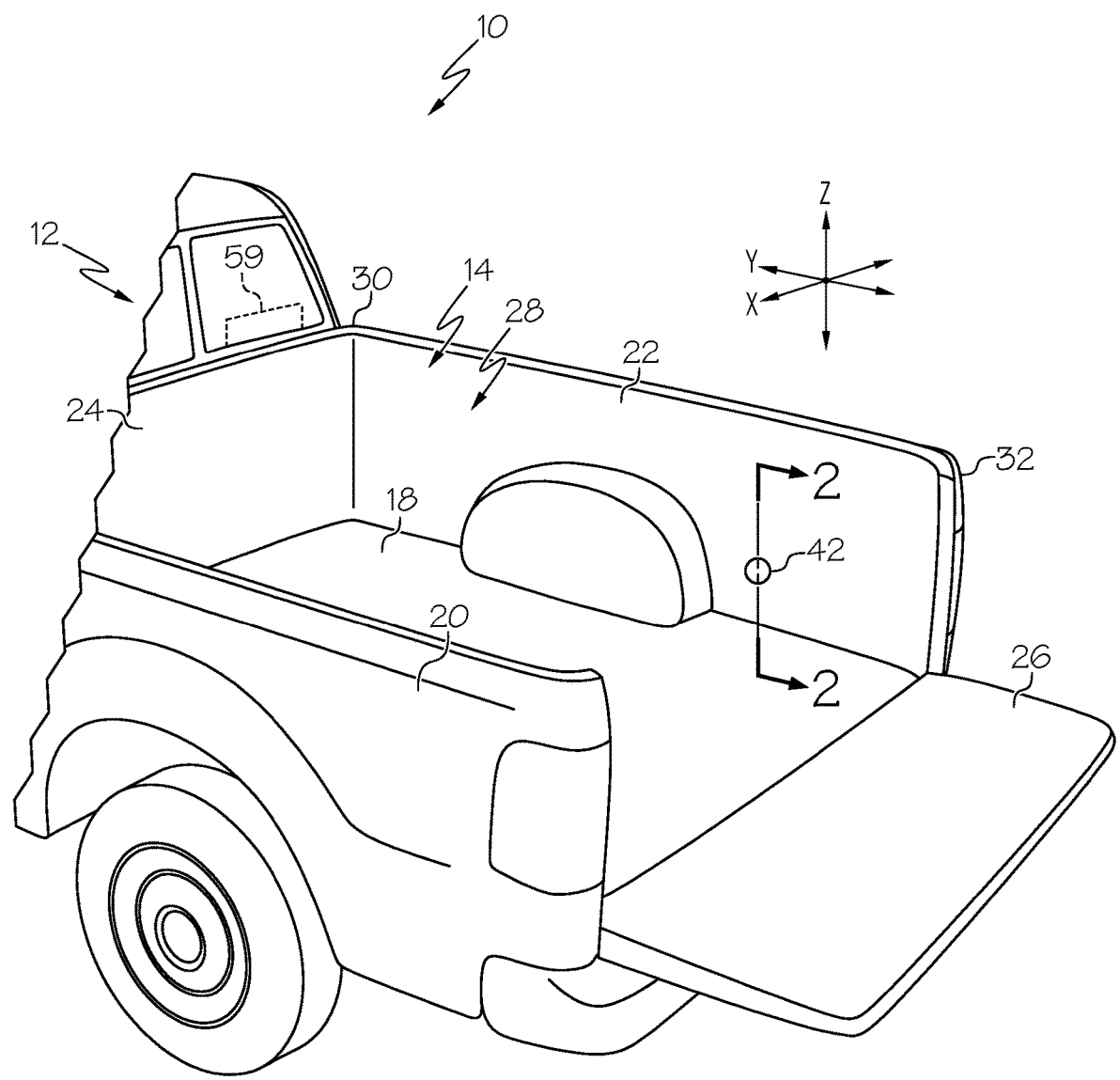
FIG. 1 diagrammatically depicts a side view of a pickup truck having a truck bed, according to one or more embodiments shown and described herein.

As used herein, the term "vehicle longitudinal direction" refers to the forward-rearward direction of the pickup truck (i.e., in the +/−vehicle Y direction depicted in FIG. 1). The term "vehicle lateral direction" refers to the cross-pickup truck direction (i.e., in the +/−vehicle X direction depicted in FIG. 1), and is transverse to the vehicle longitudinal direction. The term "vehicle vertical direction" refers to the upward-downward direction of the pickup truck (i.e., in the +/−vehicle Z-direction depicted in FIG. 1). As used herein, "upper" and "above" are defined as the positive Z direction of the coordinate axis shown in the drawings. "Lower" and "below" are defined as the negative Z direction of the coordinate axis shown in the drawings.

Referring to FIG. 1, the terms "outboard" or "outward" as used herein refers to the relative location of a component in a direction with respect to a pickup truck centerline. The term "inboard" or "inward" as used herein refers to the relative location of a component in a direction with respect to the pickup truck centerline. Because the pickup truck structures may be generally symmetrical about the pickup truck centerline, the direction to which use of terms "inboard," "inward," "outboard" and "outward" refer may be mirrored about the pickup truck centerline when evaluating components positioned along opposite sides of the pickup truck 10.

A pickup truck is generally illustrated at 10. The pickup truck 10 includes a passenger cabin 12 and a truck bed 14. The truck bed 14 includes a bed deck 18, a pair of spaced apart sidewalls 20, 22, a front wall 24, and a tailgate 26. The bed deck 18, the sidewalls 20, 22, the front wall 24, and the tailgate 26 define a storage area 28 of the truck bed 14.

The sidewalls 20, 22 extend parallel to the vehicle longitudinal direction. Each sidewall 20, 22 includes a front end 30 and an opposite rear end 32. The front wall 24 extends between the front ends 30 of the sidewalls 20, 22. The tailgate 26 extends between the rear ends 32 of the sidewalls 20, 22.

The tailgate 26 is pivotally connected to the sidewalls 20, 22 for movement between a closed position and an open position. In the closed position, the tailgate 26 extends parallel to the vehicle vertical direction. In the open position, the tailgate 26 extends parallel to the vehicle longitudinal direction as shown in FIGS. 1 and 2.

Figure 2:
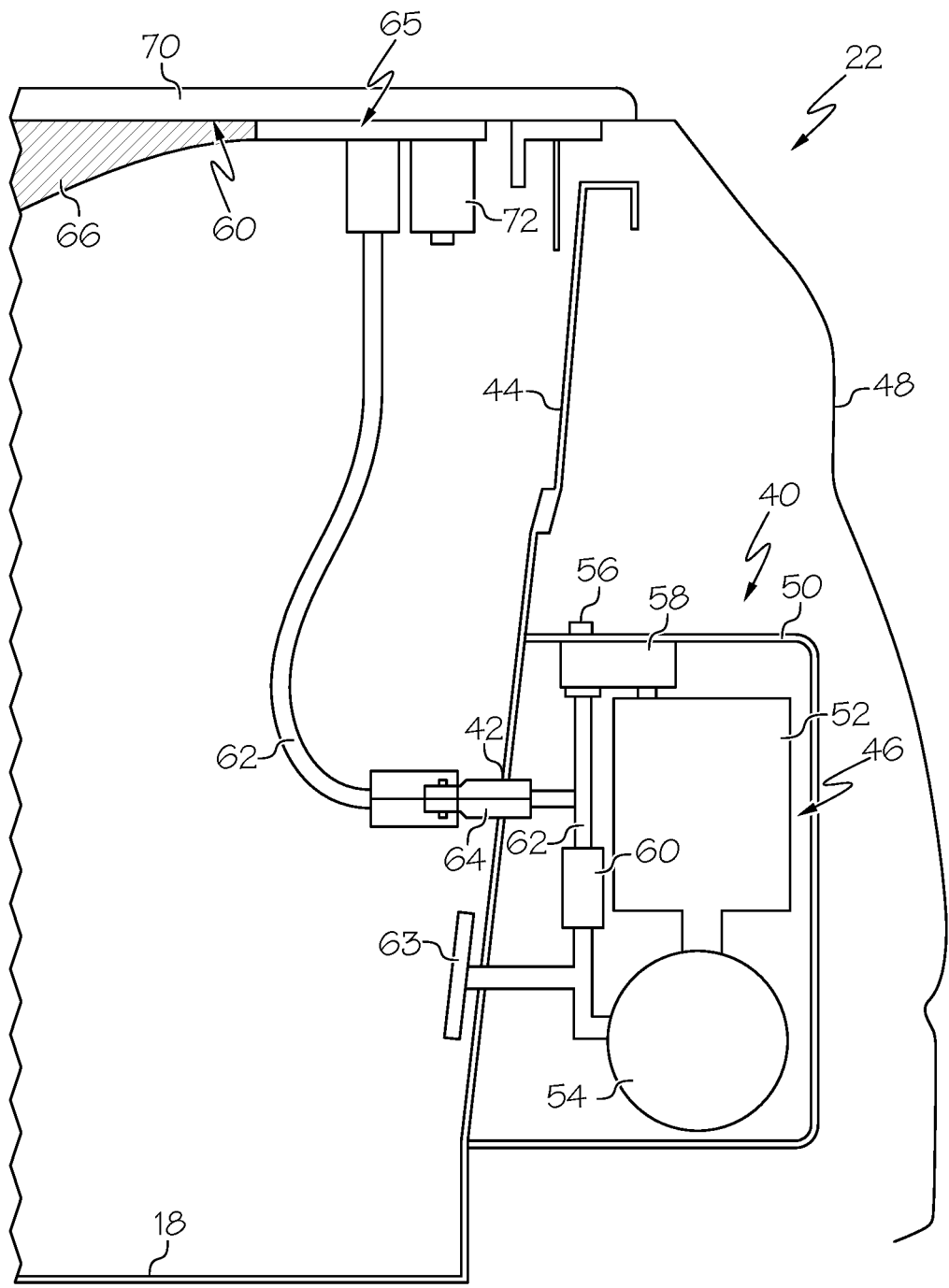
FIG. 2 diagrammatically depicts a portion of the truck bed of the pickup truck of FIG. 1 with a cover along line 2-2 of FIG. 1 showing a compressor unit inside a sidewall of the truck bed and a bladder connected to a truck bed cover, according to one or more embodiments shown and described herein.

Referring to FIG. 2, inside the sidewall 22 is a pressurized air system 40 that is connected to an outlet 42 that extends through an inner sidewall panel 44 of the sidewall 22. The pressurized air system 40 includes a compressor unit 46 that is located between the inner sidewall panel 44 and an outer sidewall panel 48 of the sidewall 22 such that the compressor unit 46 is not visible from outside the truck 10. The compressor unit 46 is fixedly mounted within the sidewall 22 at a location that is spaced from the inner sidewall panel 44 and the outer sidewall panel 48. In some embodiments, the compressor unit 46 may be at least partially enclosed by a compartment wall 50. The compartment wall 50 can be formed of any suitable material, such as stainless steel, ceramic, foam, etc. The compressor unit 46 may be any suitable type, such as positive displacement using a rotary screw, rotary vane or piston. In some embodiments, the compressor unit 46 may be wired directly to the truck 10 so that there is no need for separate batteries or other power source.

The compressor unit 46 may include a compressor motor 52 and a compressor tank 54 operatively connected to the compressor motor 52. The compressor motor 52 is used to provide the movement that pressurizes the air in the compressor tank 54. The compressor tank 54 is connected to an air inlet 56 mounted to the compartment wall 50. A valve 58, such as a solenoid valve, may be provided at the air inlet 56 that can be used by an electronic control unit 59 (ECU) of the vehicle (FIG. 1) to control the intake of air into the compressor tank 54. A pressure relief valve 60 may also be provided along conduit 62 that can be opened to depressurize the compressor tank 54. A pressure gauge 63 may be provided so that a tank pressure can be monitored from outside the sidewall 22.

An exterior conduit 62 may be removably connected to a connector 64 at the outlet 42. The exterior conduit 62 may be flexible so that an end of the exterior conduit 62 can be connected to a mating connector 64 of an inflatable bladder 66. The exterior conduit 62 may have any suitable length. The inflatable bladder 66 is removably connected to an underside 68 of a truck bed cover 70. The inflatable bladder 66 can be connected to the underside 68 of the truck bed cover 70 using any suitable connection or combination of connections, such as snaps, hook and loop, straps, clips, etc. As will be described below, the inflatable bladder 66 can be inflated while connected to the underside 68 of the truck bed cover 70 to provide a cargo stabilizer. The bladder 66 can also be removed from the underside 68 of the truck bed cover 70 to provide a mattress, such as for a tent or for the bed deck 18 of the truck bed 14 (FIG. 1). The bladder 66 may also include an air release valve 72 (e.g., a solenoid valve) that can be used by the ECU to deflate the bladder 66 automatically (e.g., when a destination is reached) or based on input from a user input, such as a switch or multimedia display. In some embodiments, the compressor unit 46 may be used to deflate the bladder 66. Air from the bladder 66 can be used as the supply air for the compressor which would evacuate the air. The valve 58 can be used to switch the air source for the compressor unit 46 between outside air and air from the bladder 66.

Figure 3:
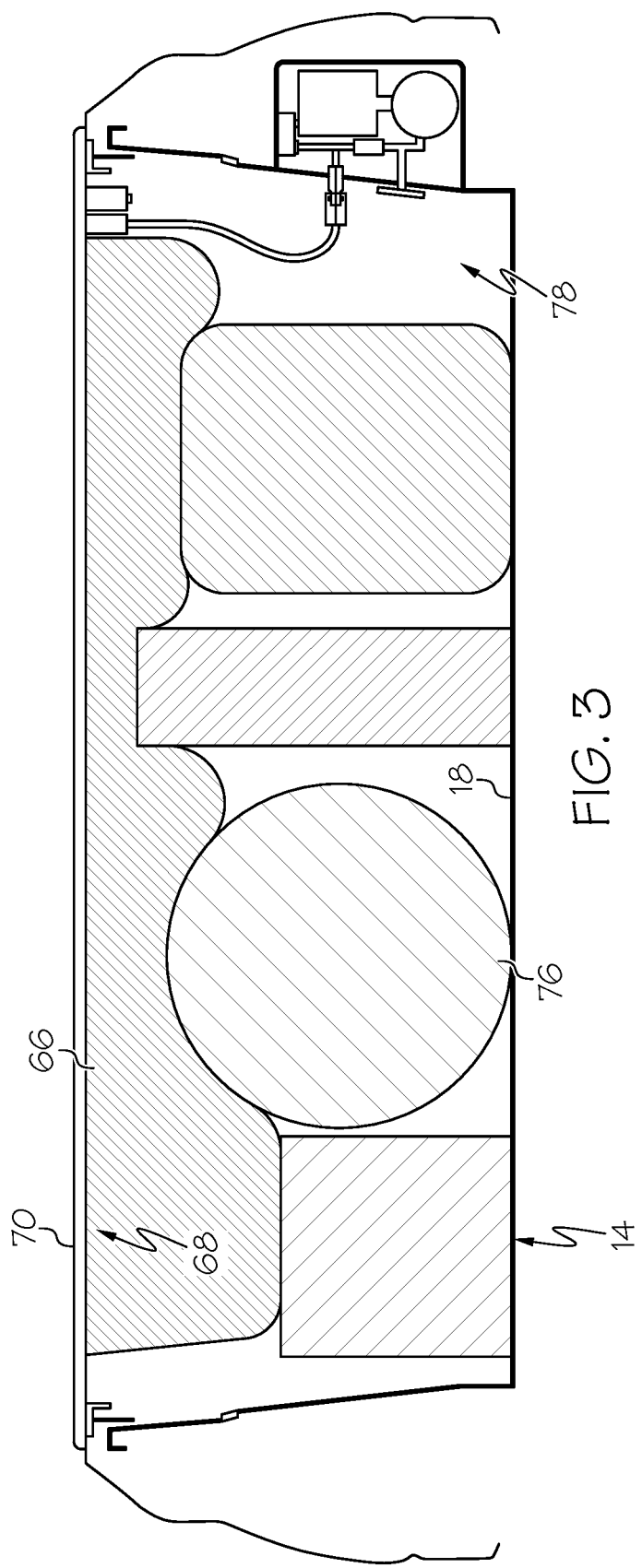
FIG. 3 diagrammatically depicts a section view of the truck bed of FIG. 2 with the bladder at least partially inflated, according to one or more embodiments shown and described herein.

Referring to FIG. 3, when inflated and connected to the underside 68 of the bed cover 70, the bladder 66 can act as a cargo stabilizer by impinging on cargo 76 in the truck bed 14. The bladder 66 has an inflated thickness that is sized to at least partially fill a volume 78 of the truck bed 14 between the truck bed cover 70 and the bed deck 18. For example, the bladder 66 may be sized to fill at least 20 percent or more, at least 30 percent or more, at least 40 percent or more, at least 50 percent or more, at least 60 percent or more, as least 70 percent or more, at least 80 percent or more, at least 90 percent or more, about 100 percent of the volume 78 measured between the sidewalls 20 and 22, truck bed cover 70 and bed deck 18 with the bladder 66 fully inflated. In some embodiments, the user input can be used to control the amount of pressure provided in the bladder 66. For example, a user may want more or less pressure in the bladder 66 depending on the type and/or size of cargo being carried. In some embodiments, the vehicle ECU may monitor and control the amount of pressure in the bladder.

Figure 4:
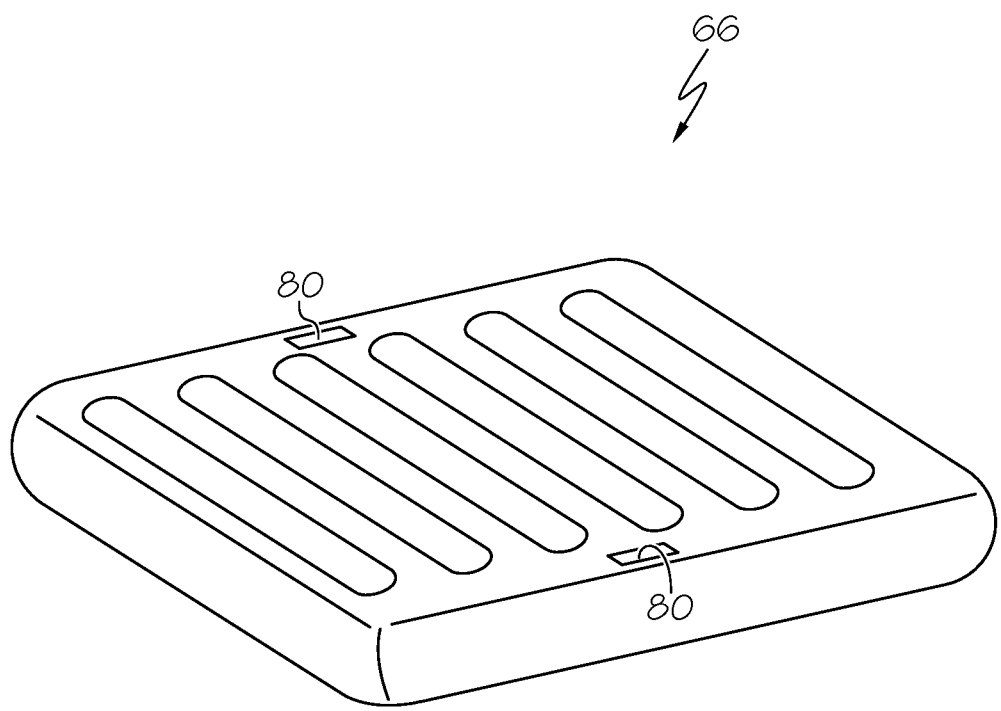
FIG. 4 illustrates the bladder of FIG. 3 removed from the truck bed cover to provide a mattress, according to one or more embodiments shown and described herein.

Referring to FIG. 4, as mentioned above, the bladder 66 can have connectors 80 that releasably attach to the truck bed cover 70. The connectors 80 can be released and the bladder 66 can be used as a mattress of soft covering for a floor, ground, bed deck 18 or even used inside the cabin 12 of the vehicle 10 (FIG. 1). The exterior conduit 62 may also be disconnected from the mating connector 64 of the bladder 66.

The above-described trucks include a pressurized air system that is located within a sidewall of the truck bed and is separate from the tuck HVAC unit. The pressurized air system is used to inflate an air bladder that is releasably connected to an underside of a truck bed cover. Once inflated, the bladder takes up space in the truck bed, impinging on cargo, which inhibits the cargo from moving around the truck bed and/or vibrating. The pressurized air system can be controlled using controls mounted on the sidewall of the truck bed and/or within the cabin. In some embodiments, the pressurized air system may be controlled wirelessly using a smartphone or other computing device. The user can select the amount of pressure provided to the bladder. While a truck with a truck bed is described above, other vehicle with storage spaces, such as SUVs may utilize the bladder and pressurized air system described herein.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A truck comprising:
  a passenger cabin;
  a truck bed located rearward of the passenger cabin in a vehicle longitudinal direction, the truck bed includes a bed deck and a pair of spaced apart sidewalls;
  a compressor unit located between an inner sidewall panel and an outer sidewall panel of one of the sidewalls;
  a truck bed cover that covers the truck bed; and
  a bladder connected to an underside of the truck bed cover, the compressor unit connected to the bladder and configured to inflate the bladder.

2. The truck of claim 1, wherein the bladder is releasably connected to the truck bed cover.

3. The truck of claim 1, wherein the bladder is sized and configured to fill at least twenty percent of a total volume of the truck bed measured between the side walls, the bed deck and the truck bed cover.

4. The truck of claim 1, wherein the compressor unit comprises a valve that changes an air source for the compressor unit from outside air to air inside the bladder.

5. The truck of claim 1, wherein the compressor unit is located in an enclosure located between the inner sidewall panel and the outer sidewall panel of the one of the sidewalls.

6. The truck of claim 1, wherein the compressor unit comprises a pressure gauge.

7. A method of providing a cargo stabilizer for a truck bed, the method comprising:
   connecting a bladder to an underside of a truck bed cover;
   placing a compressor unit between an inner sidewall panel and an outer sidewall panel of the truck bed; and
   fluidly connecting the compressor unit to an inlet of the bladder.

8. The method of claim 7, wherein the step of connecting the bladder to the underside of the truck bed cover includes releasably connecting the bladder to the underside of the truck bed cover.

9. The method of claim 7 further comprising connecting the truck bed cover to the truck bed, the truck bed including a bed deck and a pair of sidewalls.

10. The method of claim 9, wherein the bladder is sized and configured to fill at least twenty percent of a total volume of the truck bed measured between the side walls, the bed deck and the truck bed cover.

11. The method of claim 7, wherein the compressor unit comprises a valve, the valve changing an air source for the compressor unit from outside air to air inside the bladder.

12. The method of claim 7, wherein the compressor unit is located in an enclosure located between the inner sidewall panel and the outer sidewall panel of the one of the sidewalls.

13. The method of claim 7, wherein the compressor unit comprises a pressure gauge.

\* \* \* \* \*